(12) United States Patent
Francis et al.

(10) Patent No.: US 8,607,280 B2
(45) Date of Patent: Dec. 10, 2013

(54) RESOURCE AND CAPABILITY BORROWING

(75) Inventors: Stephen S. Francis, Saratoga, CA (US); Johannes Schmidt, Los Altos Hills, CA (US); David Daney, San Jose, CA (US); Kevin Shen, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1304 days.

(21) Appl. No.: 10/754,891

(22) Filed: Jan. 8, 2004

(65) Prior Publication Data

US 2004/0187152 A1 Sep. 23, 2004

Related U.S. Application Data

(60) Provisional application No. 60/439,089, filed on Jan. 8, 2003.

(51) Int. Cl.
*H04N 7/18* (2006.01)
*G06F 3/00* (2006.01)

(52) U.S. Cl.
USPC ............ 725/78; 725/58; 725/59; 725/80; 725/83

(58) Field of Classification Search
USPC ........................................ 725/78–83
See application file for complete search history.

(56) References Cited

U.S. PATENT DOCUMENTS

| | | | |
|---|---|---|---|
| 5,214,556 A | 5/1993 | Kilbel | |
| 6,798,974 B1 | 9/2004 | Nakano et al. | |
| 7,171,677 B1 * | 1/2007 | Ochiai | 725/80 |
| 7,283,970 B2 | 10/2007 | Cragun et al. | |
| 2002/0040475 A1 | 4/2002 | Yap et al. | |
| 2002/0109732 A1 | 8/2002 | Ward, III et al. | |
| 2002/0118954 A1 | 8/2002 | Barton et al. | |
| 2002/0184638 A1 * | 12/2002 | Agnihotri et al. | 725/89 |
| 2003/0009520 A1 | 1/2003 | Nourbakhsh et al. | |
| 2003/0037151 A1 | 2/2003 | Montvay et al. | |
| 2003/0086023 A1 * | 5/2003 | Chung et al. | 348/714 |
| 2003/0121047 A1 * | 6/2003 | Watson et al. | 725/93 |
| 2003/0188316 A1 | 10/2003 | DePrez | |
| 2003/0193619 A1 * | 10/2003 | Farrand | 348/731 |
| 2003/0237093 A1 | 12/2003 | Marsh | |
| 2004/0049797 A1 * | 3/2004 | Salmonsen | 725/132 |
| 2004/0163130 A1 * | 8/2004 | Gray et al. | 725/132 |
| 2004/0258390 A1 * | 12/2004 | Olson | 386/46 |
| 2005/0102698 A1 * | 5/2005 | Bumgardner et al. | 725/80 |
| 2007/0174287 A1 * | 7/2007 | McEnroe et al. | 707/10 |

FOREIGN PATENT DOCUMENTS

EP 1134972 A2 1/2001

* cited by examiner

*Primary Examiner* — Jun Fei Zhong
(74) *Attorney, Agent, or Firm* — Trop, Pruner & Hu, P.C.

(57) ABSTRACT

Systems and techniques for sharing the capabilities of consumer electronic devices. In one aspect, a method includes receiving a task involving audio/video content from a user, identifying which device in an interconnected system of devices is operable to initiate the performance of the task, and assigning responsibility for the performance of the task to the identified device. The interconnected system includes two or more devices at remote locations.

5 Claims, 11 Drawing Sheets

RESOURCE AND CAPABILITY BORROWING

CROSS-REFERENCE TO RELATED APPLICATION

This application claims the priority of U.S. Provisional Application Ser. No. 60/439,089, filed on Jan. 8, 2003 and entitled "RESOURCE AND CAPABILITY BORROWING," the contents of which are incorporated herein by reference.

BACKGROUND

The invention relates to consumer electronics devices.

Consumer electronic devices are often the sum of discrete resources and capabilities (hereinafter "capabilities") devoted to the performance of specific functions and operations. For example, a television set can include one or more mechanisms for interfacing with a user (e.g., input devices such as a remote control and integrated manual controls, output devices such as the on-screen video image and text displays and audio output), tuning devices for extracting a desired signal from a mixed input, and signal processing devices for adjusting the desired signal to the specific desires of a user. As another example, a digital video recorder can include an infrared input for a remote control, a tuner, a hard disk for data storage, and a control element that controls the operation of the digital video recorder.

SUMMARY

The present invention provides methods and apparatus, including computer-program products, for using the capabilities of discrete consumer electronic devices elsewhere, e.g., by other consumer electronic devices.

In one aspect of the invention, an apparatus includes an audio/video content recording device operable to store recorded audio/video content. The device includes a first data output to output the recorded audio/video content for display at a display device and a second data output to output the recorded audio/video content for display at a second display device. The first data output has a first bandwidth sufficient to establish a real-time connection to the display device. The second data output has a second bandwidth insufficient to establish a real-time connection to the second display device This and other aspects can include one or more of the following features. The first data output can be operable to output the recorded audio/video content to the first display device in a television signal standard. The second data output can include a portion of a home data communications network.

The apparatus can also include an operations control element configured to control operations of the audio/video signal recording device and the output of the recorded audio/video content to the display devices. The operations control element can include a data input configured to receive a task from a user. The operations control element can include a task start input configured to receive a user prompt to start performance of a task.

The audio/video signal recording device can also include a data storage device communicatively coupled for data communication to the operations control element. The data storage device can include information identifying tasks for which the operations control element is responsible and/or information identifying other operations control elements in a system of devices interconnected to the audio/video signal recording device by a data link. The data storage device can also include information identifying tasks for which other operations control elements are responsible. The audio/video signal recording device can be a digital device that stores the recorded audio/video signals in digital format.

In another aspect, a system includes a first audio/video signal display device operable to display a channel of a television signal, a television signal tuner locally associated with the first audio/video signal display device, a second audio/video signal display device operable to display the channel of the television signal, a first data link connecting the television signal tuner to the first audio/video signal display device, and a second data link connecting the television signal tuner to the second audio/video signal display device. The tuner is adapted to isolate the channel from the television signal. The second audio/video signal display device is located remotely from the television signal tuner.

This and other aspects can include one or more of the following features. The television signal tuner can be one of a satellite television signal tuner, a digital cable television signal tuner, or a high definition broadcast television signal tuner. The first data link can have a first bandwidth sufficient to establish a real-time connection between the television signal tuner and the first audio/video signal display device. The second data link can have a second bandwidth insufficient to establish a real-time connection between the television signal tuner and the second audio/video signal display device.

In another aspect, a method includes receiving a task involving audio/video content from a user, identifying which device in an interconnected system of devices is operable to initiate the performance of the task, and assigning responsibility for the performance of the task to the identified device. The interconnected system includes two or more devices at remote locations.

This and other aspects can include one or more of the following features. The audio/video content can be relayed from the remote device to the first location for display in real time. The user request can be received at a data processing device. The user request can include a request that the audio/video content be displayed at a second location remote from the first location.

The method can include assembling the remote devices into the interconnected system. The assembly can include receiving a notice of a change in a capability of a certain remote device. The notice of the change can be a failure to receive a message from the certain remote device. The assembly can also include identifying the remote one or more devices and identifying one or more capabilities of the remote one or more devices. A list of the identified remote one or more devices and the identified capabilities of the remote one or more devices can be generated.

The planning of how to perform the task can include identifying at least one remote capability in the interconnected system and reserving a right to use the remote capability to perform the task. The remote capability can be an out-of-zone device capability found in a device with a limiting interconnection to a performance location where the task is performed. A reservation can be sent out over the limiting interconnection, e.g., to an out-of-zone control element managing scheduling of the remote capability.

The planning can also include accessing a description of capabilities of the devices in the interconnected system and comparing the task with the description of the capabilities. A notice of a conflict with a new task over the reserved remote capability can be received and the conflict over the reserved remote capability can be resolved. For example, the conflict can be resolved by rescheduling the right to use the reserved remote capability or by identifying an additional capability in the interconnected system and reserving a right to use the additional capability to perform the task.

In another aspect, a method includes receiving a task involving audio/video content from a user, identifying which device in an interconnected system of devices is operable to initiate the performance of the task, and assigning responsibility for the initiation of the task to the identified device. The interconnected system includes two or more devices at remote locations.

This and other aspects can include one or more of the following features. The device that is operable to initiate the performance of the task can be identified by identifying a master operations control unit in the interconnected system. The capabilities of the devices in the interconnected system to be used in the performance of the task can be identified and responsibility for the performance of the task can be assigned based on the identified capabilities. The bandwidth of a data link in the interconnected system to be used in the performance of the task can be identified and responsibility for the performance of the task can be assigned based on the identified bandwidth.

In another aspect, a method includes receiving an indication of a loss of a device from an interconnected system of devices, reassembling the interconnected system to account for the loss of the lost device, and planning the performance of one or more tasks involving one or more of display and recording of audio/video content on the reassembled interconnected system.

This and other aspects can include one or more of the following features. The lost device can be a television signal recording device and/or a television signal tuner. The method can also include continuing, for a specified time, with a task list for the interconnected system that predates the receipt of the indication of the loss of the device. A task list for the lost device can also be integrated into a task list for the interconnected system. The performance of the one or more tasks can be planned by identifying a new device in the interconnected system that is operable to run a performance of a certain task and/or identifying a capability of a device in the reassembled interconnected system that is operable to replace a capability in the lost device.

The invention can be implemented to realize one or more of the following advantages. A device that lacks a capability found at another device can "borrow" the missing capability from an interconnected device. The range of capabilities available to each device is thus expanded since additional, remotely located capabilities are accessible. This approach can also be used to reduce the size and cost of individual devices, since redundancy of capabilities can be eliminated.

Capability sharing is particularly relevant to digital video recorders, where the cost of the device is quite high but the capabilities of the digital video recorder are often desirable at multiple locations (e.g., at each of several discrete television sets distributed throughout a home). Moreover, combining the capabilities of a digital video recorder with other devices can provide a richer set of entertainment options. For example, a particular program can be recorded from a broadcast, from a satellite source, or from a data communications network source.

With capability borrowing, it is thus easy to add capabilities to a system by adding separate devices to a system rather than adding functional components to discrete devices. The capabilities of the discrete devices and the stored content of the discrete devices are in effect summed to provide convenient, inexpensive, and feature filled and reduced size systems with extended capabilities. In the context of providing television content to viewers, a flexible approach can be applied to system expansion as capabilities can be added either in-box (new components) or in additional boxes (new devices). For example, data storage devices and additional tuners can be added flexibly, as needed. Multiple television units can work as one, without unnecessary capability redundancy across the devices in the interconnected system. Such interconnected systems can support multiple television displays allowing a user to view any show anywhere in the system, regardless of local equipment limits. Moreover, redundancy can be built into the system. Important data can be replicated and stored at multiple locations. Interconnected systems can also robustly handle the failure or unavailability of devices, device capabilities, or interconnections between devices.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

The capabilities of remote interconnected devices can be made available in a particular device interacting with a user. The user can thus interact with a single device that includes the sum of the interconnected capabilities. The augmented device can be accessed in any location where the local capabilities (e.g., a display screen) suffice to deliver the specific performance desired by the user.

Figure 1:
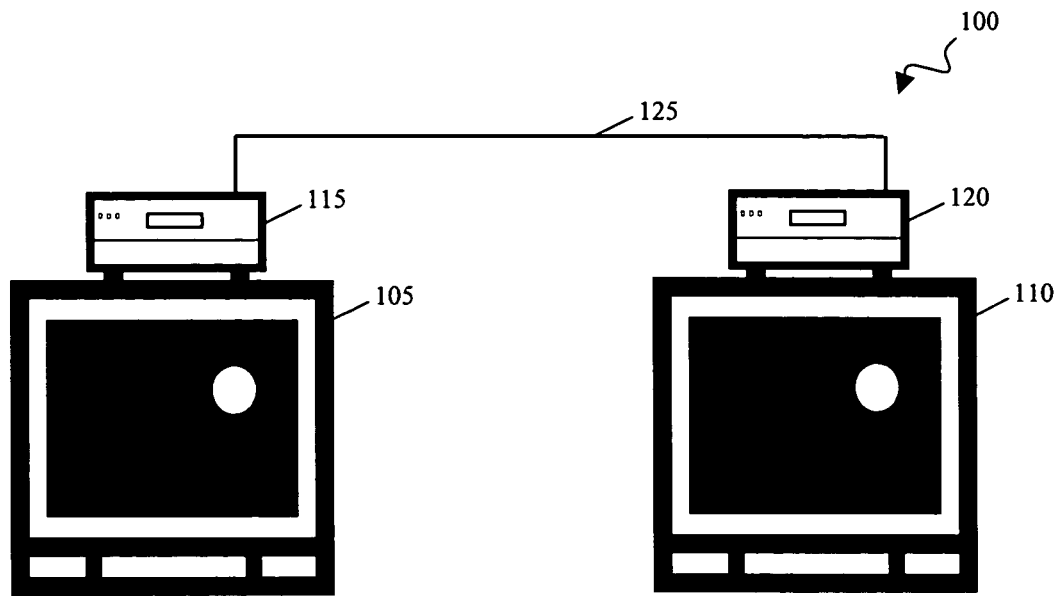
FIG. 1 shows an interconnected system in which the capabilities of consumer electronic devices are shared in the system.

FIG. 1 shows an interconnected system 100 in which the capabilities of remote consumer electronic devices are shared in the system. System 100 includes televisions 105, 110, personal video recorders (PVR's) 115, 120, and a data link 125. Televisions 105, 110 are consumer electronics devices that receive and display television signals encoding transient images. Television signals also commonly include audio components. Television signals can be received by terrestrial broadcast, satellite, cable, or data communications network. In North America, television signals are commonly transmitted in accordance with the National Television Standards Committee (NTSC) standard or the Advanced Television Systems Committee (ATSC) standard, whereas Phase Alternation Line (PAL) and Sequential Couleur avec Memoire (SECAM) standards are used elsewhere. Other new standards can also used to transmit television signals. Television signals can convey video images at various spatial resolutions (e.g., high definition (HD) television signals). Television signals can be broadly and uniformly distributed to a viewing public or television signals can also be personalized to a viewer (such as in video-on-demand or pay-per-view services and when television signals are delivered over the Internet (IPTV)).

PVR's 115, 120 are consumer electronics devices that record television signals to a storage device in digital format. The television signals can be recorded in compressed format. For example, PVR's 115, 120 can use a compressed digital format (e.g., the MPEG format) to encode and store analog broadcast television signals. PVR's 115, 120 can use a digital format to transcode and store digital satellite television signals. PVR 115 is operable to transfer recorded television signals and other television programming content in real-time to television 105 for display. PVR 120 is operable to transfer recorded television signals and other television programming content in real-time to television 110 for display. PVR's 115, 120 can also retrieve stored television signals for playback on televisions 105, 110, as discussed further below. Commercially, personal video recorders are also known as digital video recorders (DVR's), personal TV receivers (PTR's), personal video stations (PVS's), and hard disk recorders (HDR's).

Data link 125 is a wired or wireless data communication link for the exchange of information amongst televisions 105, 110 and PVR's 115, 120. Thus televisions 105, 110 and PVR's 115, 120 can include data input and output elements for data transfer over data link 125. Data link 125 can be part of a home data communications network. Television 105 can be remote from television 110 in that television 105 is located in a different room than television 110. Data link 125 can operate following one or more specifications for data communication including, e.g., IEEE 1394, USB 2.0, 100 Base-T, 802.11 (e.g., 802.11a, 802.11b, or 802.11 g), as well as proprietary standards.

In operation, a user at one of televisions 105, 110 can access capabilities from other devices in system 100. For example, PVR 115 can receive instructions from a user at television 105 to retrieve and play a television signal stored at PVR 120. PVR 115 can retrieve the stored television signal from PVR 120 over data link 125, and play the retrieved signal on television 105. As another example, PVR 120 can receive instructions from a user at television 110 to retrieve and play a television signal stored at PVR 115. PVR 120 can retrieve the stored television signal from PVR 115 over data link 125, and play the retrieved signal on television 110. Such sharing of capabilities expands the range of capabilities available to users at each of televisions 105, 110 since remotely located capabilities are accessible over data link 125.

A system with remote interconnected devices (e.g., system 100 of FIG. 1) includes an interconnection (e.g., link 125) between the devices that carries information related to control and content. Control information includes data that identifies, configures, and/or operates the interconnected devices as desired. Content information includes data that is transferred from a source device and operated upon (e.g., converted, presented, stored, etc.) at a destination device. Examples of content information include audio and video program information. The content information can be in a form that is used directly at the destination device or the content information can be processed (e.g., compressed, decompressed, or otherwise manipulated) prior to use.

In some implementations, the interconnection between devices is used to transfer content information at a speed and with a reliability such that the destination device can operate to immediately present the transferred data to a user. Typically, this means that the interconnection provides the real-time, reliable transfer of one or more streams of audio and/or video program information, often in a compressed format. Such a transfer can provide the appearance that the capabilities of remote devices are seamlessly integrated with the local device.

Several different media and methods can be used to form such interconnections. In one implementation, an IP network with quality of service characteristics suitable for one compressed video stream at a required image quality and resolution is used. The interconnection can be wired or wireless. The interconnection can carry both control and content information. Alternatively, the interconnection can also include discrete sub-connections that include different capabilities and segregate control and content or split either control or content over multiple sub-connections.

Several different formats can be used to communicate control and content information. In one implementation, Remote Method Invocation (RMI) is used. Alternatively, other approaches including Simple Object Access Protocol (SOAP), an eXtentible Markup Language (XML)-based message format, or Jini (a Java-centric framework on top of RMI) can be used.

Examples of capabilities that can be made available to remote interconnected devices can include storage space (available capacity, read speed, write speed), program source/tuner (data format, head end or location), compressor (input formats, output formats), decompressor (input formats, output formats), user input (capable of accepting user input via buttons, remote control, etc.), and user output (capabilities of displaying information to a user).

One consequence of storage space being made available to remote interconnected devices is that recorded programs and other data can reside on one or more storage devices (e.g., storage devices within PVR's 115, 120). In some implementations, a user can specify that data is to be stored at a particular storage device, even if the location is remote from the recording device. In other implementations, the system can select where data is to be stored without user input. In some implementations, (e.g., when the interconnect bandwidth is low and data storage is inexpensive), all recorded television content can be stored locally to every display device. Such redundant storage ensures that the recorded content is always locally available to a user. In other implementations, a television content file can be stored in a distributed, non-redundant manner at several storage devices. For example, a hard disk constituting a percentage of the data storage capacity of an interconnected system can store roughly the same percentage of a television content file.

In one implementation, data storage is performed using a per-file block-based RAID scheme. Each data file is broken into chunks (typically 1 MB) which can be identified by their message digest 5 (MD5) value. A RAID is used to store sets of chunks on more than one physical storage device. For example, if four devices are interconnected, three chunks can be stored on three devices and an XOR of the first three chunks can be stored on the fourth device. The additional chunks are distributed among the four storage devices except that the device that stores the XOR of the next three chunks is alternated. The distribution can be the same, or altered (i.e., more than one storage device can be used to store redundancy information) The system can be configured to accommodate devices running out of space (e.g., if one device runs out of disk space, the system can automatically store future chunks on only the available devices).

In one implementation, redundant storage is used to hold system setup information, user history, and other data that is high in value but relatively small in size. In other implementations, redundant storage is also used for user-originated data, e.g., digital pictures and movies that are loaded onto the system.

Figure 2:
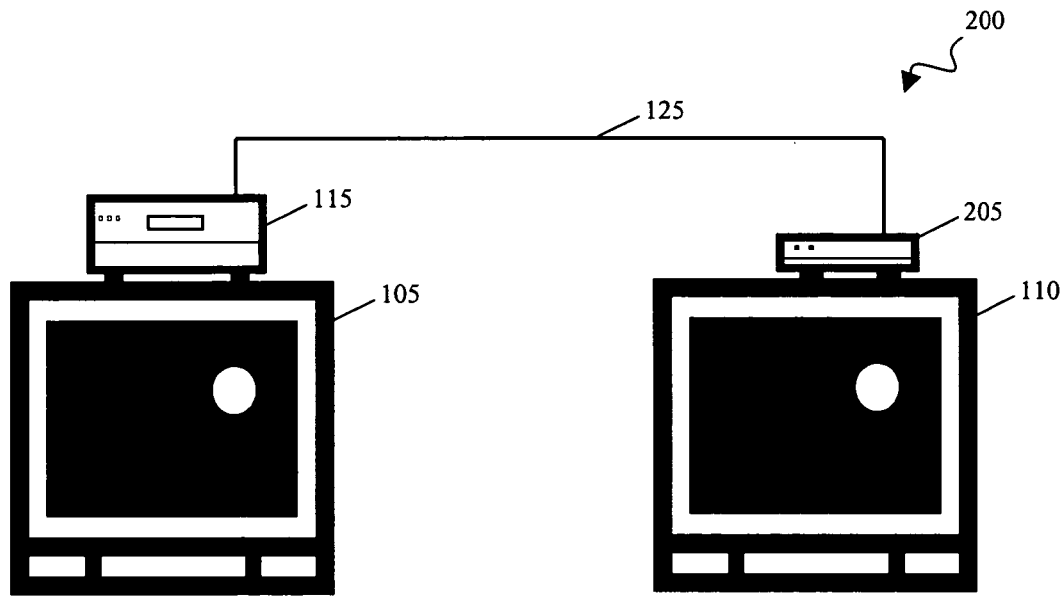
FIGS. 2-6 show other interconnected systems.

FIG. 2 shows another interconnected system 200 in which the capabilities of consumer electronic devices are shared in the system. In addition to televisions 105, 110, PVR 115, and data link 125, system 200 also includes a control and decode unit 205. Control and decode unit 205 is a consumer electronics device that receives a television signal over data link 125 and prepares the received signal for display (e.g., on television 110). For example, control and decode unit 205 can receive a compressed digital television signal stream over data link 125 from PVR 115 and convert the television signal for NTSC or other analog or digital format display on television 110. Control and decode unit 205 can thus include data input, output, and processing elements, as well as control and decode electronics.

In operation, control and decode unit 205 can receive instructions from a user at television 110 to retrieve and play a television signal stored at PVR 115. Control and decode unit 205 can retrieve the stored television signal from PVR 115 over data link 125, and play the retrieved signal on television 110.

Figure 3:
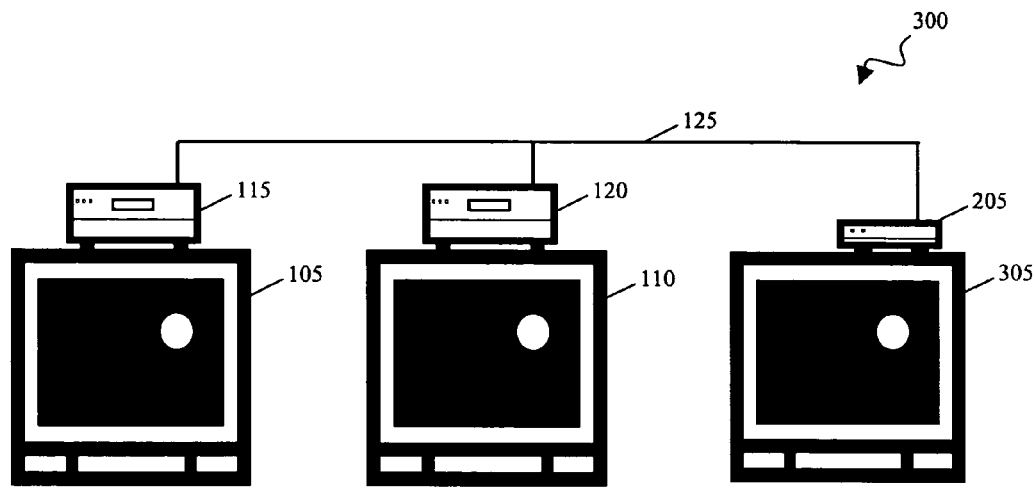

FIG. 3 shows another interconnected system 300 in which the capabilities of consumer electronic devices are shared in the system. System 300 includes televisions 105, 110, PVR's 115, 120, data link 125, and control and decode unit 205, as well as an additional television 305.

In operation, a user at any one of televisions 105, 110, 305 can access capabilities from other devices in system 300. For example, PVR 115 can receive instructions from a user at television 105 to retrieve and play a television signal stored at PVR 120, PVR 120 can receive instructions from a user at television 110 to retrieve and play a television signal stored at PVR 115, and control and decode unit 205 can receive instructions from a user at television 305 to retrieve and play a television signal stored at either or both of PVR's 115, 120. The stored television signals can be retrieved over data link 125 and played on the appropriate of televisions 105, 110, 305.

Figure 4:
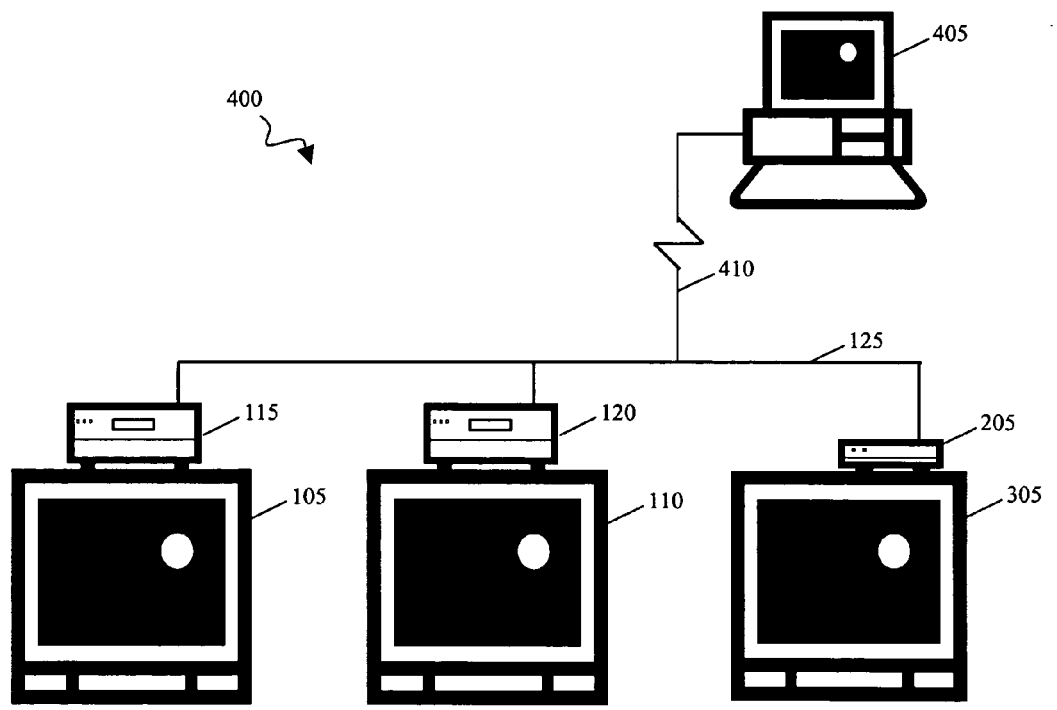

FIG. 4 shows another interconnected system 400 in which the capabilities of consumer electronic devices are shared in the system. In addition to televisions 105, 110, 305, PVR's 115, 120, data link 125, and control and decode unit 205, system 400 also includes a data processor 405. Data processor 405 is a device that performs data processing activities in accordance with the logic of a set of machine-readable instructions. The instructions can be can be realized in digital electronic circuitry, integrated circuitry, specially designed ASICs (application specific integrated circuits), computer hardware, firmware, software, and/or combinations thereof. Data processor 405 can interact with a user over one or more I/O devices to receive user input triggering certain of the data processing activities. Data processor 405 can be, e.g., a personal computer, a handheld device, a cell phone, or a dedicated consumer electronics device.

Data processor 405 also includes data input and output elements for data communication over data link 125. Data link 125 can include an inter-network portion 410 that connects data processor 405 (and potentially other networks) with the remainder of data link 125. Portion 410 can be a wired or wireless electrical and/or optical local area network or wide area network (such as the Internet), or combinations thereof. Thus, data processor 405 can be outside of a home data communications network that includes the remainder of data link 125.

In operation, system 400 additionally allows a user at data processor 405 to access capabilities from other devices in system 400. For example, data processor 405 can receive instructions from a user to have PVR 115 record a television signal received at PVR 120. Data processor 405 can relay the instructions to PVR 115, which in turn can coordinate with PVR 120 to record the television signal as instructed. As another example, PVR 115 can receive instructions from a user to record a television signal received at PVR 120. PVR 115 can coordinate with data processor 405 to record the television signal on a data storage device at data processor 405.

Figure 5:
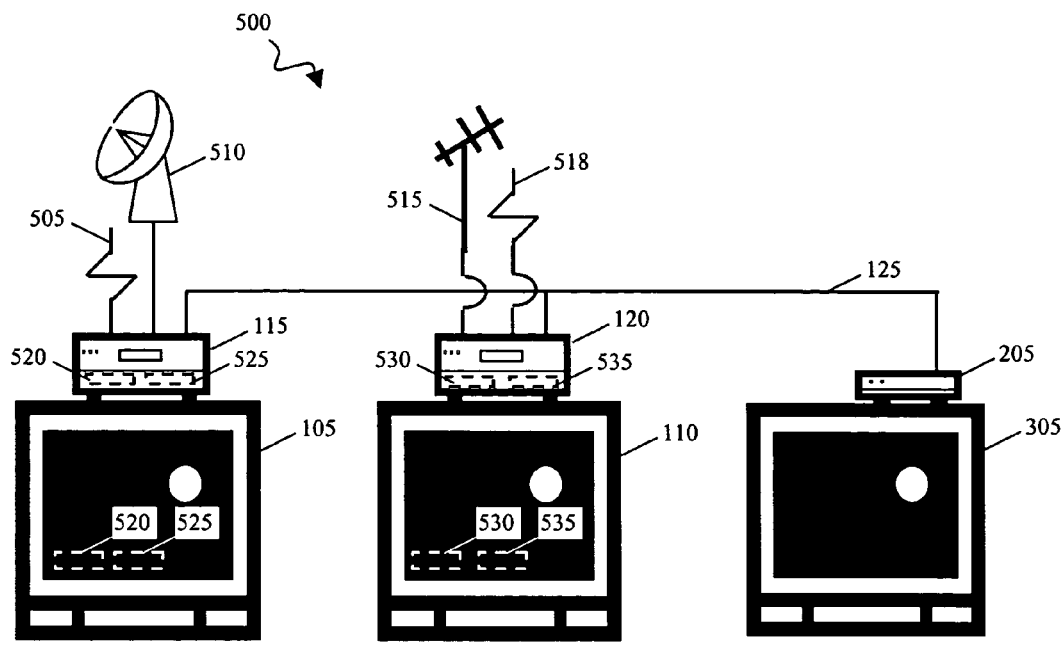

FIG. 5 shows an interconnected system 500 that illustrates one advantage of extending the availability of capabilities of consumer electronic devices. In addition to televisions 105, 110, 305, PVR's 115, 120, data link 125, and control and decode unit 205, system 500 also includes a cable line 505, a satellite receiver 510, an antenna 515, and a network line 518. Cable line 505 receives analog and/or digital television signals from a cable service provider. Satellite receiver 510 receives digital television signals from a satellite source. Antenna 515 receives analog or digital television signals from a broadcaster. Network line 518 receives digital television signals from a digital communications network source, such as the Internet.

To isolate particular channels from the received television signals, television 105 and/or PVR 115 can include a cable tuner 520 and a satellite tuner 525. Television 110 and/or PVR 120 can include an over-the-air tuner 530 and a data communications input 535. Cable tuner 520 can be a digital cable television signal tuner. Over-the-air tuner 530 can be a high definition broadcast television signal tuner.

In operation, a user can access capabilities from devices throughout system 500. For example, PVR 115 can receive instructions from a user at television 105 to have PVR 120 isolate a channel in a broadcast television signal received over antenna 515 using over-the-air tuner 530. PVR 115 can also receive instructions from the user to have PVR 120 record the isolated channel. PVR 115 can relay an isolate and record command to PVR 120, which in turn can isolate the channel using over-the-air tuner 530 and record the isolated channel.

Such sharing of capabilities thus also reduces the need for redundant equipment without impairing the range of capabilities available to users. In system 500, there is no need for television 105 and PVR 115 to include an over-the-air tuner 530 and there is no need for television 110 and/or PVR 120 to include a cable tuner 520 and a satellite tuner 525, since these capabilities are available over data link 125. Such capability sharing can reduce the cost of system 500 without impairing function.

Further examples of interconnected systems and the operation of such systems can include:

A digital VCR that offers its tuner and read/write access to its tape data storage to the system (e.g., system 500), but itself does not offer augmented capabilities to its users. In one example, a digital TV that includes a screen, a digital tuner, and an image combiner is interconnected with the digital VCR. The digital TV can identify the VCR and access its tuner to provide a second signal to the combiner for picture in picture functionality.

Two PVR devices can be interconnected such as shown in FIG. 1. Each includes a tuner, a de/compressor, and a storage device. The first PVR (e.g., PVR 115) can be used to tune, compress, and store a signal. The second PVR (e.g., PVR 120) identifies the first PVR and the stored content. The second PVR can operate to pull the stored content from the first PVR to the second PVR's decompressor and then locally display the result.

Again, two PVR devices can be interconnected such as shown in FIG. 4. A first PVR (e.g., PVR 115) can include two tuners and a de/compressor, but lacks a storage device and is attached to a first TV. A second PVR (e.g., PVR 120) includes one tuner, a de/compressor, and a storage device, and is attached to a second TV. A user interface (UI) box includes and IR input/output and is attached to a third TV. A storage box device dedicated to data storage includes a disk drive add-on (not shown). A personal computer (PC) (e.g., data processor 405) includes a hard drive with some free disk space and has a firewall connection to the Internet. These devices are interconnected. Example operations include (a) the second PVR, the storage box, and the PC can store programs tuned and compressed on the first PVR;
(b) the UI box (via the third TV) can present any stored show and can be used to request/review future recording events;
(c) the PC can form an HTML interface for controlling recording that occurs at one of the PVR's. The PC can also form a browser external to the firewall; and
(d) the second PVR, the storage box, and the PC can store programs tuned on the first PVR in an uncompressed format.

Figure 6:
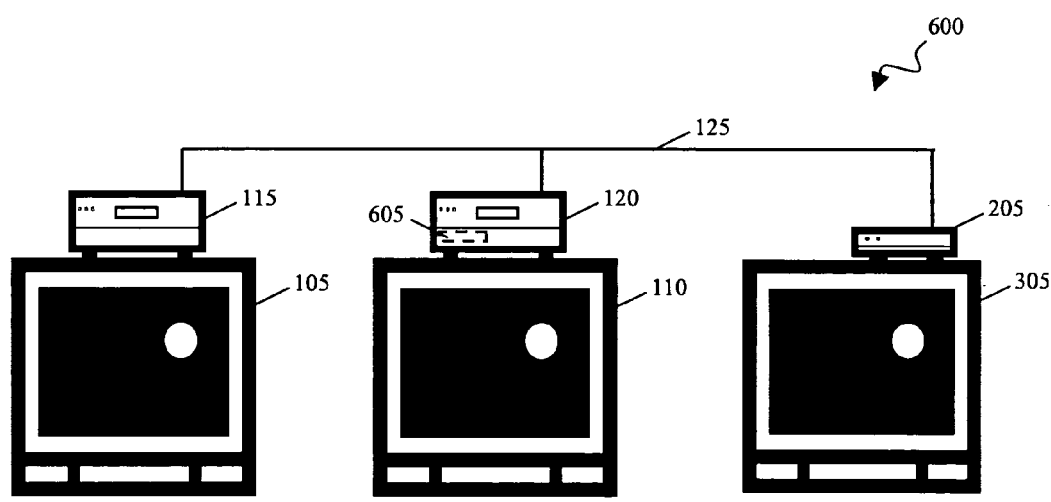

FIG. 6 shows an interconnected system 600 that includes televisions 105, 110, 305, PVR's 115, 120, data link 125, and control and decode unit 205. PVR 120 additionally includes an operations control element 605. Operations control element 605 can be a device that performs data processing activities in accordance with the logic of a set of machine-readable instructions. The instructions can be can be realized in digital electronic circuitry, integrated circuitry, specially designed ASICs (application specific integrated circuits), computer hardware, firmware, software, and/or combinations thereof. Operations control element 605 can interact with a user and with televisions 105, 110, 305, PVR 115, other elements in PVR 120, and control and decode unit 205 to make capabilities of the devices in system 600 shared in the system. In particular, operations control element 605 recognizes capabilities in system 600, identifies those capabilities to a user, and controls the operation of the capabilities in accordance with user instructions. System 600 can include more than one operations control element 605. Operations control element 605 can also recognize, identify, and control the capabilities of PVR 120.

Operations control element 605 can interact with a user through one or more input and output devices. For example, operations control element 605 can receive user input over an IR receiver in PVR 120 or over a keyboard or a key pad. Operations control element 605 can provide a user with information over a display panel built into PVR 120 or over the display screen of a display unit (e.g., television 110). For example, operations control element 605 can display a list of the capabilities of system 600, as well as a list of all available media channels, program schedules, and stored content, using television 110.

Figure 7:
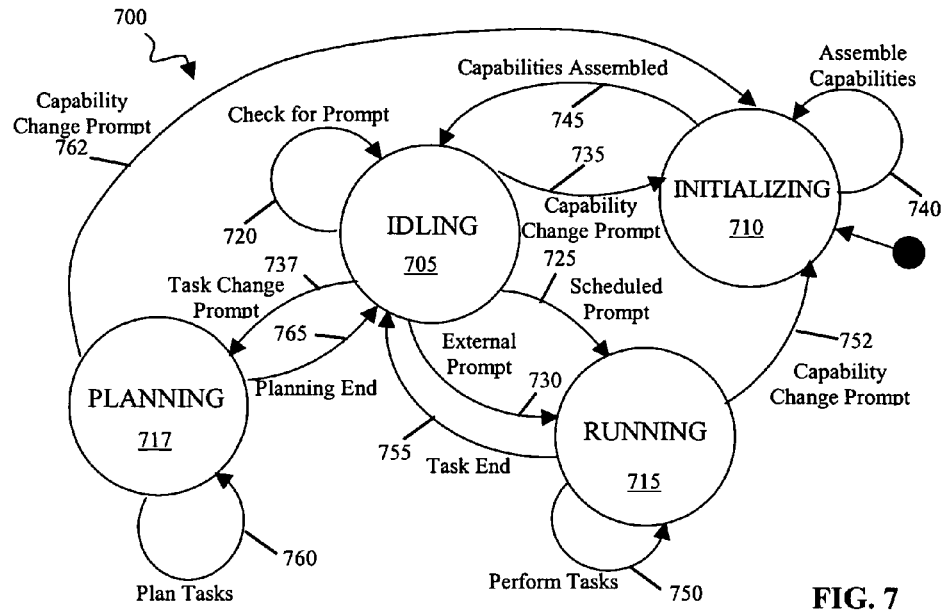
FIG. 7 shows a state diagram for an operations control element in an interconnected system.

FIG. 7 shows a state diagram 700 for operations control element 605. State diagram 700 includes an idling state 705, an initializing state 710, a running state 715, and a planning state 717. Idling state 705 is associated with operations control element 605 awaiting a prompt to plan tasks, perform tasks, or (re)assemble the capabilities of system 600. Idling state 705 originates a reflexive transition 720 and state transitions 725, 730, 735, 737. Reflexive transition 720 is associated with operations control element 605 checking for an interrupt or other prompt. State transition 725 is triggered by a scheduled prompt, such as reaching a time specified by a user for the performance of a certain task. State transition 730 is triggered by an external prompt, such as a user indicating that a task is to be performed immediately. State transition 735 is triggered by a capability change prompt, indicating that a change in the capabilities of system 600 has occurred (e.g., a new device has been added or an existing device has failed). State transition 737 is triggered by a task change prompt, indicating that a user is interacting with operations control element 605 to change a task (e.g., schedule a new task, cancel an existing task, or reschedule an existing task) to be performed by system 600.

Initializing state 710 is associated with operations control element 605 assembling or reassembling the capabilities of system 600 for the performance of tasks. Planning state 710 originates a reflexive transition 740 and a state transition 745. Reflexive transition 740 is associated with operations control element 605 assembling capabilities of system 600 in preparation for the performance of tasks. The assembly can include polling system capabilities and registering them, as discussed further below. State transition 745 is triggered by the end of the assembly.

Running state 715 is associated with operations control element 605 performing of one or more specific tasks. Such specific tasks can include initiating and/or periodically monitoring the performance of a task by the capabilities and resources in system 600. For example, operations control element 605 can provide operational instructions to a local or a remote capability in system 600 to initiate a task. Running state 715 originates a reflexive transition 750 and state transitions 752, 755. Reflexive transition 750 is associated with operations control element 605 performing a specific task. State transition 752 is triggered by a capability change prompt indicating that a change in the capabilities of system 600 has occurred. State transition 755 is triggered by the end of the performance of such a task. For example, state transition 755 can be triggered by operations control element 605 completing initiation of the performance of a task.

Planning state 717 is associated with operations control element 605 analyzing future tasks to determine whether the capabilities necessary to perform such tasks will be available at the appropriate time and allocating the capabilities appropriately. Such planning can include an optimization of a task in that the most efficient approach to performing the task can be determined. Planning state 717 can also involve operations control element 605 canceling current activities in system 600, for example, in response to user instructions to cancel or modify such a current task. Planning state 717 originates a reflexive transition 760 and state transitions 762, 765. Reflexive transition 760 is associated with operations control element 605 planning the performance of a specific task using the capabilities of system 600. State transition 755 is triggered by the end of such planning. State transition 752 is triggered by a capability change prompt indicating that a change in the capabilities of system 600 has occurred.

In operation, operations control element 605 can start in initializing state 710 where it assembles capabilities by identifying and organizing the capabilities of the interconnected devices. When assembly is completed, operations control element 605 can transition along state transition 745 to idling state 705 where it awaits one of the various prompts. When a task change prompt is received, the system transitions along state transition 737 to planning state 717, where operations control element 605 receives information regarding the changed task and allocates the assembled capabilities to the performance of the changed task. The received information regarding the changed task can include user responses to queries regarding the desired allocation of capabilities. Allocation can include scheduling the dedication of a portion of the bandwidth of data link 125 for the performance of the task or dedicating memory in one or more of PVR's 115, 120 for recording. When such planning is ended, operations control element 605 returns to idling state 705 along state transition 765.

When operations control element 605 receives either a scheduled prompt (e.g., a scheduled time for a certain task has arrived) or an external prompt (e.g., a user directs the immediate performance of a task that does not conflict with a scheduled task), operations control element 605 transitions from idling state 705 to running state 715 over the appropriate of state transitions 725, 730. While in running state 715, operations control element 605 controls system 600 to perform the prompted task. When the performance is completed, operations control element 605 returns to idling state 705.

When operations control element 605 receives a capability change prompt (e.g., when a new device has been added to system 600, the capabilities of an existing device have been changed, or an existing device has failed in whole or in part), operations control element 605 returns from idling state 705 to initializing state 710 along state transition 735. Operations control element 605 can also return to initializing state 710 from running state 715 and planning state 717 when a capability is changed. While in initializing state 710, operations control element 605 assembles the changed capabilities and returns to idling state 705 along state transition 745 when finished.

In one implementation, when operations control element 605 is in running state 715, operations control element 605 can also plan the performance and allocate capabilities for the performance of a requested task. In a simple case, this may be a real-time request made during the performance of other tasks. For example, the user may request that a certain radio station is played. Operations control element 605 can find a tuner in system 600 which can tune to the requested station and relay the tuned content to the location where the user wants to hear the station. Alternatively, the user may request to see a list of available video content that has been stored. Operations control element 605 can assemble a content list for all devices (e.g., PVR's 115, 120) that have stored video content. The requested task may also be a more complicated "scheduled" task. For example, the user may request that, at 5:30 AM every day that is not a weekend or a holiday, tune one tuner to 98.5 FM, determine whether it is a song or a commercial, and as soon as it is not a commercial, direct the content to the speakers in the bedroom, starting at 5% volume and increasing 1% every five seconds until 20% volume." Operations control element 605 can run the task at the appointed time without leaving running state 715, if necessary.

A single interconnected system can include multiple operations control elements. For example, in system 600, both PVR's 115, 120 can include an operations control element 605. Various approaches to unifying the operation of multiple operations control elements in a single system can be used. In one implementation, namely the "independent" approach, each operations control element maintains a list of future tasks for which it is responsible. Typically, these would be tasks for which the operations control element initially received the task assignment. Alternatively, the operations control element local to the majority of the required capabilities, or the operations control element with the most idle time, could be assigned responsibility. In both cases, each task is maintained by a single operations control element. A list of all tasks can be compiled by querying each operations control element. The operations control element responsible for a task can also maintain information about which (remote and local) capabilities are expected to be used to accomplish the task. The scheduling of new tasks by an arbitrary operations control element can be sped by having the devices maintain a list of times when each capability is "reserved" for use by an existing task. If a new task requires capabilities that are unavailable due to planned use by an existing task, then the operations control element(s) responsible for the two tasks can exchange data about the tasks to determine how the capabilities should be utilized.

Figure 8:
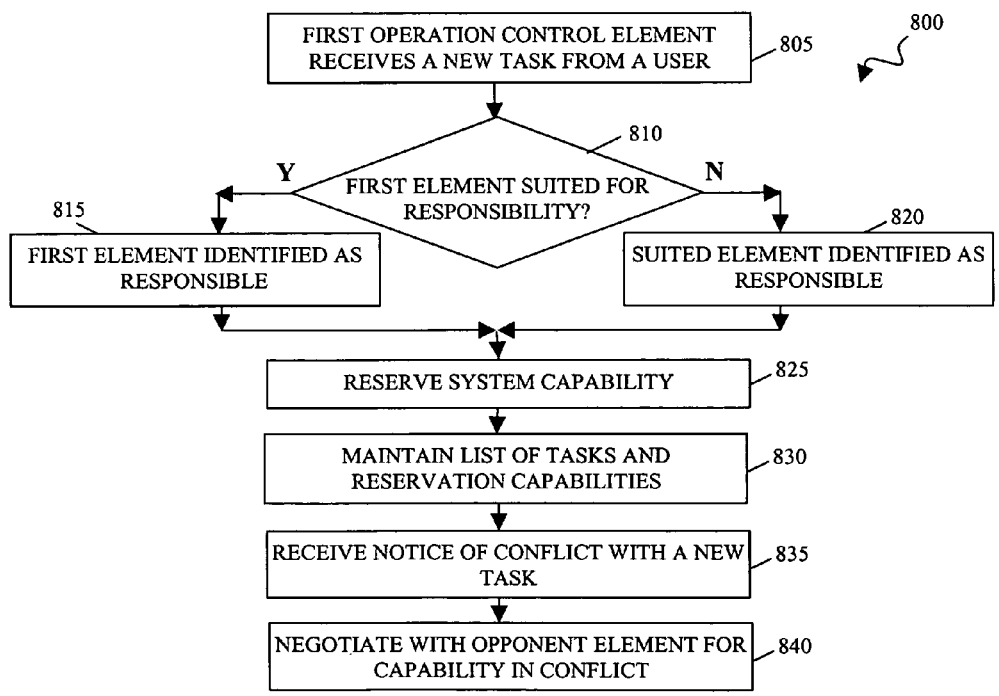
FIGS. 8-11 show processes that can be performed in systems having multiple operations control elements.

FIG. 8 shows a process 800 that can be performed in a system having multiple operations control elements and using the independent approach. A first such operations control element receives a task from a user at 805. The first element can receive the task from a user who interacts with a device at the location where the first element is located or the first element can receive the task from a remote user (such as one who transmits the task to the first element from a remote location).

The first element determines if it is suited to be responsible for the task at decision 810. The suitability of the first element can be determined by comparing the capability requirements of the task with the capabilities of the system. The nature and amount of capabilities that are local to the first element can impact such a determination, as can the bandwidth requirements on a data link when the first element is to be responsible.

If it is determined that the first element is suitable, then the first element is identified as responsible for the task at 815. The identification can be made to the first element itself and to other operations control elements in the system. Alternatively, if it is determined that another operations control element is more suitable, then the other element is identified as responsible for the task at 820.

Regardless of which operations control element is responsible, the responsible element assumes responsibility for the task by reserving one or more system capabilities for the performance of the task at 825. This reservation can be recorded at the reserved capabilities themselves, at operations control element(s) that are local to the reserved capabilities, at a central list stored in the system, and/or at the responsible operations control element. The responsible operations and control element can maintain one or more of these lists at 830.

At some point in the future, the responsible operations control element may receive a notice of conflict between the reserved capabilities and the capabilities that may be needed to perform a new task at 835. The notice of conflict may be received from another operations control element or the notice may be generated by the same operations control element when it receives a new task and attempts to reserve appropriate system capabilities. In any case, the responsible operations and control element can negotiate with the opponent element for the capability that is in conflict at 840. As a result of the negotiations, the existing reservations may be confirmed, rescheduled, or changed. It may be determined that the new task cannot be performed by the system and the user may be queried as to the desirability of canceling one or more tasks (i.e., the confirmation process).

In another implementation, the operation of multiple operations control elements in a single system can be unified using the "master" approach. In the master approach, one operations control element assumes a master role, maintains a list of all future tasks, and runs all tasks for the entire system of devices. All subordinate operations control elements forward tasks to the master operations control element. The master operations control element can be determined by comparing the operations control elements and capabilities (e.g., processing speed and local storage capabilities) of the interconnected devices. For increased reliability in the event of a failure of the master, the subordinate operations control elements can maintain synchronized copies of the task list in case the master operations control element is unavailable.

Figure 9:
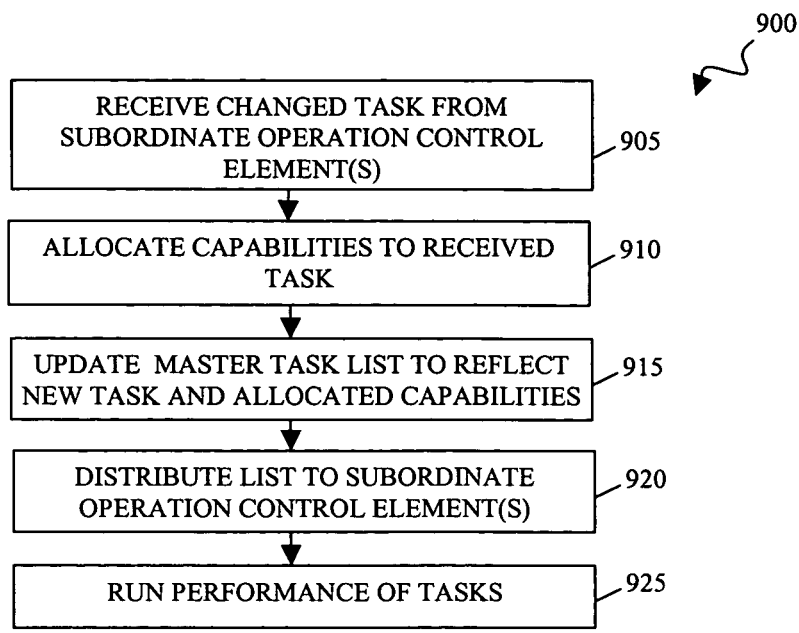

FIG. 9 shows a process 900 that can be performed by a master operations control element in a system having multiple operations control elements and using the master approach. The master operations control element receives a task from one or more subordinate operations control elements at 905. The master operations control element allocates capabilities to the received task at 910. The allocation process can include resolving conflicts between tasks or querying a user through the originating subordinate operations control element as to the desirability of canceling one or more tasks.

The master operations control element can update a master task list to reflect new task and allocated capabilities at 915. This master list can be distributed to one or more subordinate operations control elements at 920. When the appropriate time comes, the master operations control element can initiate the performance of the tasks on the master list in the system at 925.

In another implementation, the operation of multiple operations control elements in a single system can be unified using the "synchronized" approach. In the synchronized approach, each operations control element shares a list of all future tasks for the system or for a zone in the system. System zones are described below. When a new task is requested or a task is otherwise changed, the changed task is scheduled and the necessary capabilities are assigned. Later, a synchronizing message is sent to all other operations control elements.

Capabilities can be assigned for the performance of a task based on their scheduled availability when a task change is first requested by a user or based on their availability after a proposed task change is received from a user. In one implementation, an operations control element that starts to receive a task change from a user can lock all capabilities in the system or in a zone. Locking the capabilities limits changes to the availability of the capabilities during the receipt and scheduling of the task change and the assignment of resources to the changed task. The operations control element can thus complete the assignment of resources using a fixed system of resources. If another operations control element receives a second task change, then the second task change can be delayed until resources are assigned to the first changed task. A message can be provided to a user with information regarding the reason for the delay. In another implementation, an operations control element can receive the entirety of a proposed task change before locking capabilities and attempting to schedule the task change and assign of resources to the changed task. If the proposed task change is too costly or impossible for the system to perform with the available capabilities, the system can request that the user modify the proposed task change.

With a synchronized task list, any individual operations control element has the necessary information to determine how to resolve capability use conflicts between a new task and existing tasks. Each operations control element has the information necessary to direct appropriate capabilities at the time when a task will be executed.

Figure 10:
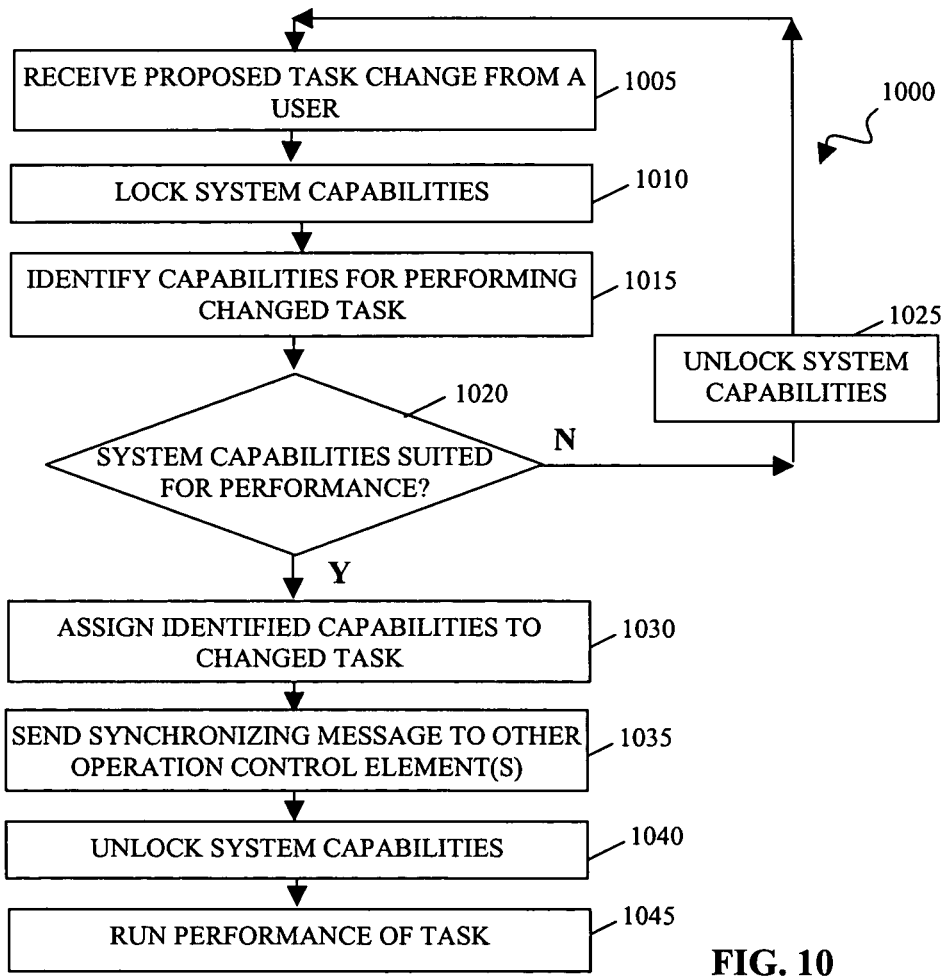

FIG. 10 shows a process 1000 that can be performed by an operations control element in a system having multiple operations control elements and using the synchronized approach. Process 1000 involves the assignment of capabilities based on their availability after a proposed task change is received from a user.

The operations control element first receives a description of a proposed task change from a user at 1005. The proposed task change can be the addition of a new task. Once a majority (e.g., all) of the proposed task change has been received, the operations control element can lock system capabilities for assignment to the proposed task change at 1010. Locking the system capabilities can include preventing the assignment of capabilities to other tasks during the lock. The operations control element can identify the capabilities in the system that are suitable for performance of the changed task at 1015. A determination can be made as to whether or not the capabilities in the system are suitable for performance of the task at decision 1020. If it is determined that the capabilities in the system are not suited for the performance of the task, the operations control element can unlock the system capabilities at 1025, present an error message to the user, and receive a further modification of the proposed task change at 1005.

If it is determined that the capabilities in the system are suited for the performance of the task, the operations control element can assign the suitable capabilities to the performance of the task at 1030. Once the suitable capabilities have been assigned to the performance of the task, the operations control element can send a synchronizing message to other operations control elements in the system at 1035. The synchronizing message can prompt the receivers to update a copy of a local task list and a local list of capability assignments to the same state through the system. The updated state reflects the assignments made at 1030. The operations control element can unlock the system capabilities at 1040. When the appropriate time comes, any operations control element (e.g., the originating operations control element) can initiate the performance of the task at 1045.

Figure 11:
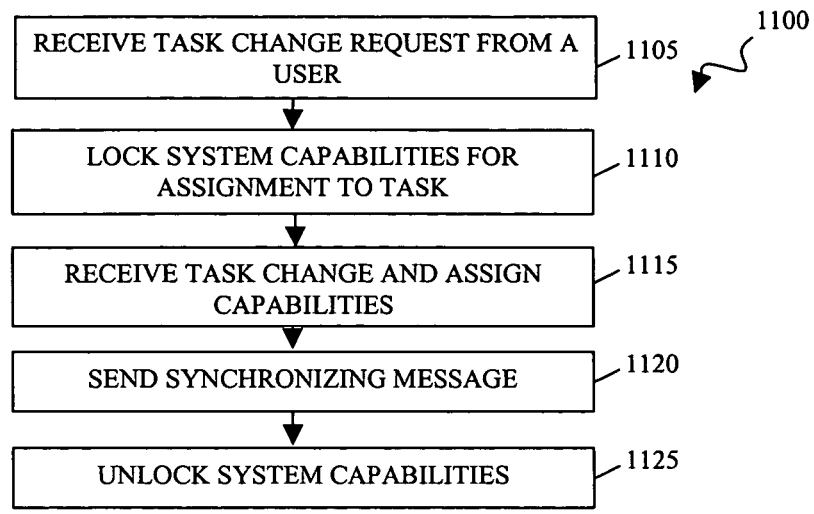

FIG. 11 shows a process 1100 that can be performed by an operations control element in a system having multiple operations control elements and using the synchronized approach. Process 1100 involves the assignment of capabilities based on their availability when a task change is first requested by a user.

The operations control element receives a request to change a task from a user at 1105. The requested task change can be the addition of a new task. The requested task change can be a minority portion of a proposed task change. Before the entirety of a proposed task change is received, the operations control element can lock system capabilities for assignment to the incoming task at 1110. Locking the system capabilities can include preventing the assignment of capabilities to other tasks during the lock and hence preventing a change in the availability of the capabilities.

After the system capabilities are locked, the operations control element can receive the proposed task change and assign capabilities to the proposed task change at 1115. This can be an interactive activity in that information regarding the availability of capabilities can be presented to a user during reception of the proposed task change and the user can propose the task change in light of that availability. Also, the operations control element can provide feedback regarding a proposed task change and receive user modifications to the proposed task change accordingly. After suited capabilities have been assigned, the operations control element can send a synchronizing message to other operations control elements in the system at 1120. The synchronizing message can reflect the assignments made at 1115. The operations control element can unlock the system capabilities at 1125. When the appropriate time comes, any operations control element (e.g., the originating operations control element) can initiate the performance of the task.

Figure 12:
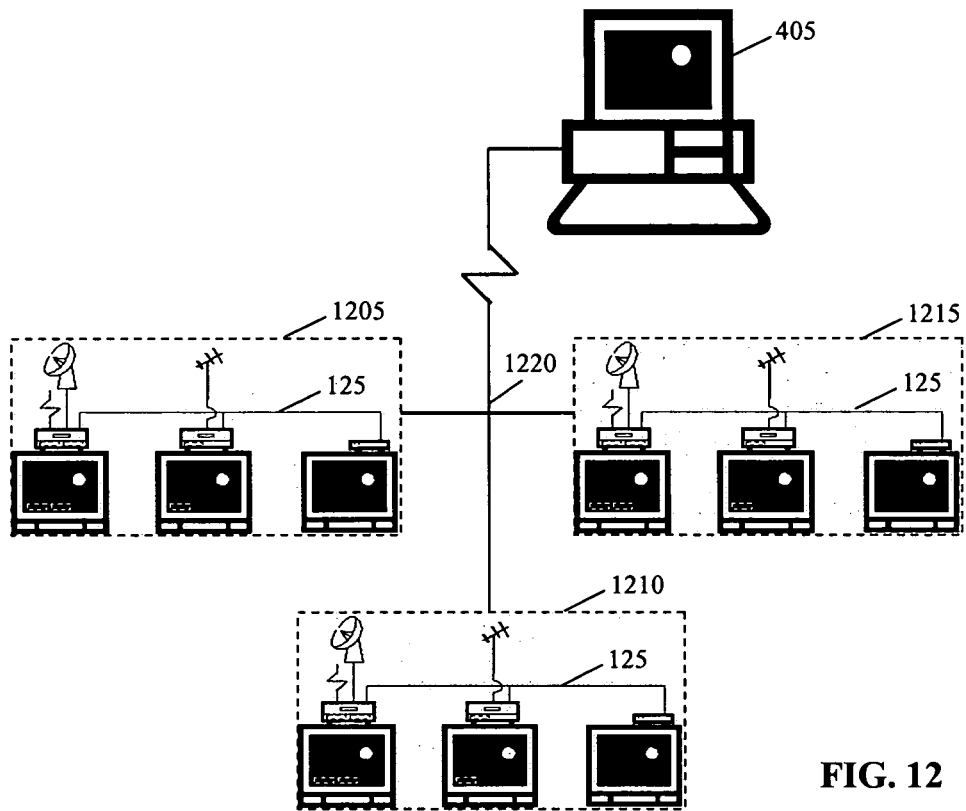
FIG. 12 shows another interconnected system.

FIG. 12 shows another interconnected system 1200 in which the capabilities of consumer electronic devices are shared in the system. System 1200 can be described as a "zone-based" system because one or more interconnections between devices in the system impact the availability of capabilities to other locations in the system. An interconnection can have such an impact due to, e.g., the interconnection having a limited bandwidth or only being active at certain times.

Zone-based systems include two or more interconnected zones of one or more devices that are themselves interconnected. In zone-based systems, "in-zone" interconnected devices (if any, since a zone can include a single device) are differentiated from "out-of-zone" interconnected devices. The capabilities of out-of-zone devices are available, but this availability may be limited. For example, such capabilities can be presented in a segregated manner to users. The out-of-zone devices can, in turn, be organized into one or more additional zones.

Zone-based systems can be implemented using a number of different interconnection media, methods, or formats for communicating control or content information. In some implementations, zone-based systems can use the same media, methods, and/or formats within zones and between zones. However, this is not necessarily the case, and the interconnection between different zones need not have a bandwidth or reliability sufficient to transfer content in real time.

Thus, in a zone-based system, a set of devices can be interconnected despite limitations arising due to interconnection technology. Further, zone-based systems can allow a user to separate sets of one or more devices for other purposes. For example, a high performance local interconnection can exist between a full-featured PVR and additional storage and tuner capabilities, whereas a lower speed interconnection, crossing a boundary between zones, can exist between the first full-featured PVR and a second full-featured PVR in another room. Alternatively, a virtual private network (VPN) can form an interconnection across the boundary between two different zones, one at a user's primary residence and the other at the user's vacation home. As another example, a parents' PVR can exist in a different zone from the children's PVR even if a high speed interconnection between the two PVR's exists. Further, the interconnection across the boundary between zones can be used to limit the use of out-of-zone capabilities (e.g., certain types of content may not be deliverable in real-time from an out-of-zone tuner, or certain capabilities may not be available unless predefined conditions are met.) Such limitations on the use of out-of-zone capabilities can be implemented using various approaches. For example, an out-of-zone capability reservation can be designated as a special form of operations control element task that requires certain local capabilities and is maintained by a local operations control element, but is run by a foreign (i.e., out-of-zone) operations control element. The local operations control element can be responsible for conflict resolution with respect to the reserved capability(s) and necessary communication with the reserving foreign operations control element. This is similar to the independent approach to unifying the operation of multiple operations control elements, but differs in that it segments the planning process to allow for limitations on foreign utilization (e.g., zone-specific rules for prioritization of out-of-zone capability requests).

A cross-zone task is a task that is run by using a combination of in-zone and out-of-zone capabilities. The out-of-zone capabilities can be located in more than one other zone. A cross-zone task can require an operations control element in each other zone to maintain an out-of-zone capability reservation.

An out-of-zone task is a task that is requested by an in-zone operations control element but will be run by an out-of-zone operations control element. The in-zone operations control element can track the task status by communication with the out-of-zone operations control element that runs the task. An out-of-zone task can be used, e.g., if all capabilities of a cross-zone task are in a single foreign zone or if the performance of the interconnection between the in-zone operations control element and the foreign out-of-zone devices is insufficient for the local operations control element to successfully run the task. In one implementation, a cross-zone content transfer task that has no quality of service (QOS) requirements can be interrupted and resumed.

System 1200 includes a first zone 1205, a second zone 1210, a third zone 1215, and an interzone connection 1220. First zone 1205, second zone 1210, and third zone 1215 can include single devices or interconnected systems of one or more devices interconnected by data links (e.g., such as systems 100, 200, 300, 400, 500, 600 of FIGS. 1-6).

Interzone connection 1220 can be a data link for the wired or wireless exchange of information amongst zones 1205, 1210, 1215. Interzone connection 1220 can be part of a public data communications network. Interzone connection 1220 can operate following one or more specifications for data communication including, e.g., TCP/IP, as well as proprietary standards. Interzone connection 1220 can also provide for the exchange of information with one or more data processors (e.g., data processor 405).

Figure 13:
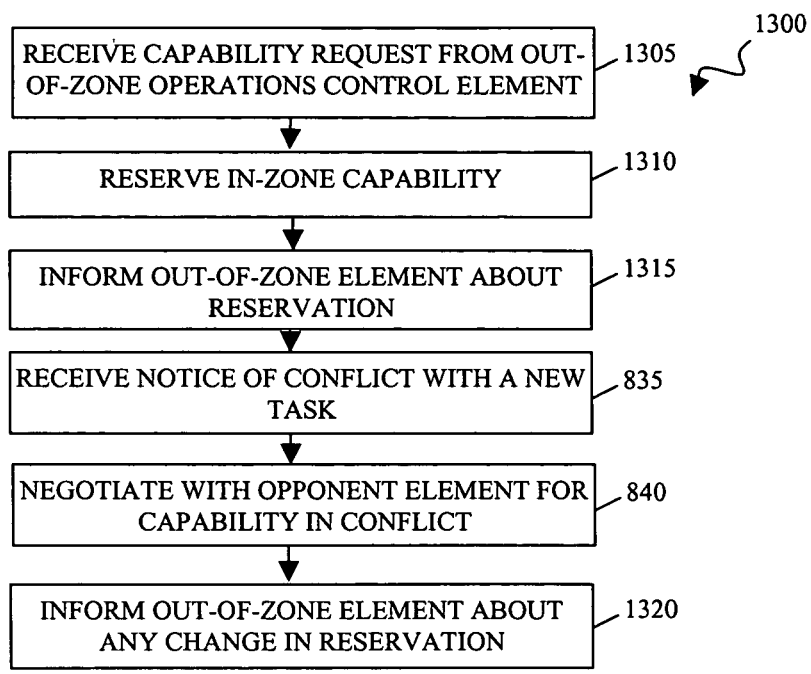
FIG. 13 shows a process that can be performed by an operations control element when reserving an in-zone capability for the performance of a task run by an out-of-zone operations control element.

FIG. 13 shows a process 1300 that can be performed by an operations control element in any of zones 1205, 1210, 1215 when reserving an in-zone capability for the performance of a task originating with an out-of-zone operations control element.

An operations control element can receive a capability request from the out-of-zone operations control element that is to initiate the performance of the task at 1305. The capability request can include an identification of the task as well as parameters relating to the requested capability such as time, duration, and technical parameters. Using the received information, the operations control element can reserve an in-zone capability for the performance of the task at 1310. The operations control element can inform the out-of-zone, requesting operations control element of the reservation (or of a failure to reserve) at 1315.

At some time after the reservation but before the performance of the task, the operations control element may receive a notice of conflict between the reserved capabilities and the capabilities that may be needed to perform a new task at 835. The operations and control element can negotiate with the opponent element for the capability that is in conflict at 840, and inform the out-of-zone, requesting operations control element of the negotiation result, including any change in the reservation, at 1320.

In some implementations, capabilities can be rearranged across zone boundaries to facilitate performance of a task. Alternatively, the zone boundaries can themselves be rearranged or created to facilitate performance of a task. For example, a display device that is typically operated in a same zone as a first storage device may be able to interconnect with the first storage device to receive a single standard resolution audio/video stream. A second storage device may be interconnected with the display device to receive a high resolution audio/video stream. Finally, the first storage device may store a high resolution audio/video stream that is desired to be displayed at the display device but cannot be transferred directly from the first storage device in real time. In such a case, the high resolution audio/video stream can first be transferred from the first storage device to the second storage device using a cross-zone content transfer task to create an in-zone copy of the content. The high resolution audio/video stream can then be delivered from the second storage device without the interconnection limitations.

As another example, a nominal zone boundary between devices be created automatically whenever the interconnection performance across the boundary is insufficient to accomplish a particular task or a limitation on the use of capabilities is desired. In turn, when the interconnection performance across the boundary is sufficient for a running task, the boundary can be eliminated.

As discussed above, an interconnected system can be initialized through the assembly of system capabilities. Assembly can also be performed when the capabilities of the system change, such as when a new device is connected to the system or when a failure occurs. For example, assembly can include polling system devices and registering them and their capabilities onto a central system directory. Assembly can also include receiving an automated request from a device that is newly added onto the system requesting that the device be registered with the system directory.

As another example, when a new device having an operations control element is interconnected with the system and the interconnection performance is sufficient, a user can specify whether the new device is to be added to a new zone or added to an existing zone. The addition of a device with a new operations control element to a new zone can be the default approach. If the new operations control element is to remain in a separate zone, then the user can specify limitations on interaction with the other zone(s). For example, when a device is temporarily interconnected to stream or transfer content (e.g., a portable PVR, a portable video player, or a portable video game device), then any planning of future tasks that would use the capabilities of the temporarily connected device is unnecessary and can be prevented.

When a new device is interconnected to a system, the new device can become part of that system. However, the system can await user input that indicates the acceptability of storage of content upon the new device. This can help insure that desired content is not inadvertently stored on a device that is only a temporary addition to the system.

When a new device is interconnected to a zonal system, user input can be requested to identify the zone that is to include the new device. In one implementation, the proper zone can be determined without user input by identifying the operations control element that has the highest performance interconnection with the new device.

When a new operations control element or device is interconnected to an existing system, a security setting can determine whether any interaction between existing devices and the new device is allowed. At a relatively high security setting, no interaction can occur without specific user input to an existing device indicating that the new device is known and safe. Such security settings can be used with a device set that is also connected to a public network such as the Internet in order to avoid external "hacking" of a set of interconnected devices.

Figure 14:
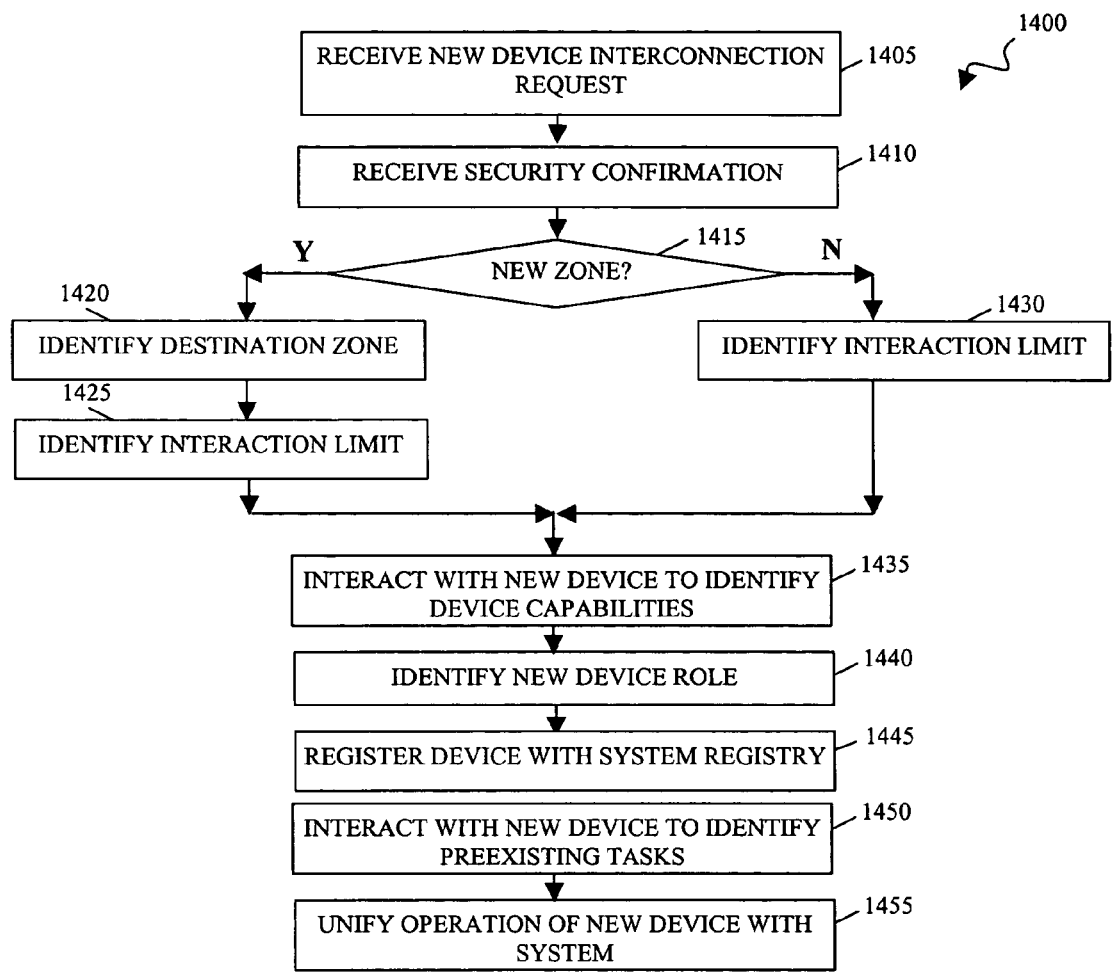
FIG. 14 shows a process that can be performed by an operations control element in a system to assemble a new device into the system.

FIG. 14 shows a process 1400 that can be performed by an operations control element in an existing system to integrate a new device into the system. The performing operations control element can be, e.g., a master operations control element in a system using the master approach, an operations control element in a system using the independent approach that is responsible for the task of integrating new devices into the system, or any operations control element in a system using the synchronized approach.

The operations control element performing process 1400 can receive a request to interconnect a new device to the existing system at 1405. The request can be generated by the newly added device upon connection to a data link to the system or by a user at an existing device in the system. The request can be generated manually or automatically. The request can include address information for the new device as well as information regarding the nature of the new device, such as the device capabilities and a model name and/or other identifier.

The element can also receive a confirmation that the new device meets certain security requirements for interconnection to the system at 1410. The confirmation can be received in response to a query generated by the operations control element performing process 1400. The confirmation can include a password or other indicator that the user authorizes interconnection of the new device to the system.

The element performing process 1400 can determine if the new device is to be added to an existing zone in the system or if the new device is to be added in an entirely new zone at decision 1415. The determination can be made based on user input, the nature of the new device, and/or default system behavior. For example, if a user indicates that the device is to be added to an existing zone, this can act as an override of all other factors. As another example, if the device is identified in the interconnection request as a portable device, the element performing process 1400 can determine that the device is to be added into a new zone so as to spare the effort of completely integrating a portable device that is likely to only be temporarily connected to the system into an existing zone.

If the element determines that the new device is to be added to an existing zone, then the element can identify the destination existing zone for the new device at 1420. The destination existing zone can be identified in input received from a user or the zone can be identified without user input based on characteristics of the device and the interconnection between the device and the system. For example, a new device that is to have a high bandwidth interconnection to a first zone but a low bandwidth interconnection to a second zone may be automatically added to the first zone.

The element can also identify a limit on the type and amount of interaction that is allowed between the new device and the existing system device(s) at 1425. Such interaction limits may include limits on access to certain capabilities in the new device (e.g., certain data may be excluded from borrowing by the system or the storage of certain data on the new device may be limited on grounds other than the physical storage capacity of the new device) as well as limits on the access of the new device to existing system capabilities. The limits can be identified, e.g., based on limits specified by the new device or by polling a user and receiving user input regarding any limit(s).

Alternatively, if the element determines that the new device is to be added to in a new zone, then the element can identify an interaction limit for the new device at 1430. For example, the storage of data at the new device may be limited, e.g., due to the temporary nature of the interconnection between the new device. In particular, if the interconnection is only temporary, then long-term data storage at the new device may be undesirable since the interconnect may endure for a shorter time than the desired data storage.

Regardless of whether the new device is to be added to an existing zone or in an entirely new zone, the element performing process 1400 can also interact with the new device to identify the capabilities of the new device at 1435. The interaction can include an exchange of information regarding the technical components of the new device, how those components are currently deployed (e.g., whether tuners are currently receiving signals and the unused storage capacity of storage devices), and the content stored in the new device.

Using the received capability information, the element can identify a role for the new device in the system at 1440 and register the new device and its role with a system registry at 1445. The role for the new device can depend upon an approach used to unify the operation of multiple operations control elements in the system. For example, when the master approach is used, the new device can be identified as including either a master operations control element or a subordinate operations control element. As another example, when the independent approach is used, the new device's role can include responsibility for certain system tasks. The element can register the new device in a central registry or a registry that is found at multiple locations in the system. The registry can include information identifying the new device, its capabilities, as well as any limit on system interaction with those capabilities.

The element performing process 1400 can also interact with the new device to identify any preexisting tasks for which the new device is currently responsible and/or running at 1450. Using the received preexisting task information, as well as the capability information, the element can also unify the operation of the new device in the system at 1455. The unification can include allocating the capabilities of the new device for the performance of previously scheduled system tasks as well as allocating system capabilities for the performance of the preexisting tasks of the new device. The unification can depend upon an approach used to unify the operation of multiple operations control elements in the system. For example, if the master approach is used and the new device is to be added to the system with its operations control element in a subordinate capacity, then responsibility for running/initializing all preexisting tasks can be transferred to the master operations control element. When the system uses the independent approach or the synchronized approach, the responsibility for individual tasks can also be reassigned.

Interconnected systems can also robustly handle the failure or unavailability of devices, device capabilities, or interconnections between devices. For example, the distributed storage capabilities of the devices in a system can be used to create and maintain multiple copies of important operations control element state data. As another example, a system-wide task list can be stored by each operations control element. Task lists, setup information, historical user information, and other data that is difficult to replace can be stored on multiple devices. Other information, including television content, can be replicated based on setup information or user requests.

Operations control elements can poll all devices on a regular schedule to determine their ongoing availability. Operations control elements can also poll out-of-zone operations control elements with which they have placed an out-of-zone capability reservation. Operations control elements and devices can perform self-checks. If subsystems or capabilities are unavailable, this can be reported in response to the polling. Alternatively, the polling can be replaced or supplemented by device-initiated and operations control element-initiated regular reporting. Also, the capability "leasing" functionality that is available in Jini and other software operating frameworks can be used to determine the ongoing availability of capabilities.

If a capability that was allocated to a task becomes unavailable, then an operations control element can use conflict resolution techniques to reassemble the system and replan (e.g., re-optimize) the task list. If new capabilities become available, then this too can trigger a reassembly and replanning.

In the independent approach for unifying devices, loss of contact between one operations control element and another can cause the operations control elements to either continue with their task lists or to integrate any available copies of the unavailable operations control element's task list and replan the combination. In one implementation, an operations control element can attempt to obtain user input to identify (or repair) the type of failure so that the proper alternative can be chosen. In the absence of such input, an operations control element can continue with its task list for a specified period (e.g., seven days) and then integrate the task list(s) of the lost operations control element(s), reassemble the system, and replan. Alternatively, an operations control element can use an alternative method of selecting an alternative. For example, if communication is lost with only one operations control element, but all other operations control elements are functional, as are all devices, then the failure of the lost operations control element can be assumed and its task list is integrated, the system reassembled, and the tasks replanned. As another example, if communication is lost simultaneously with all other devices, then the lost devices can be assumed to remain functional and the lone operations control element can run currently planned tasks.

Figure 15:
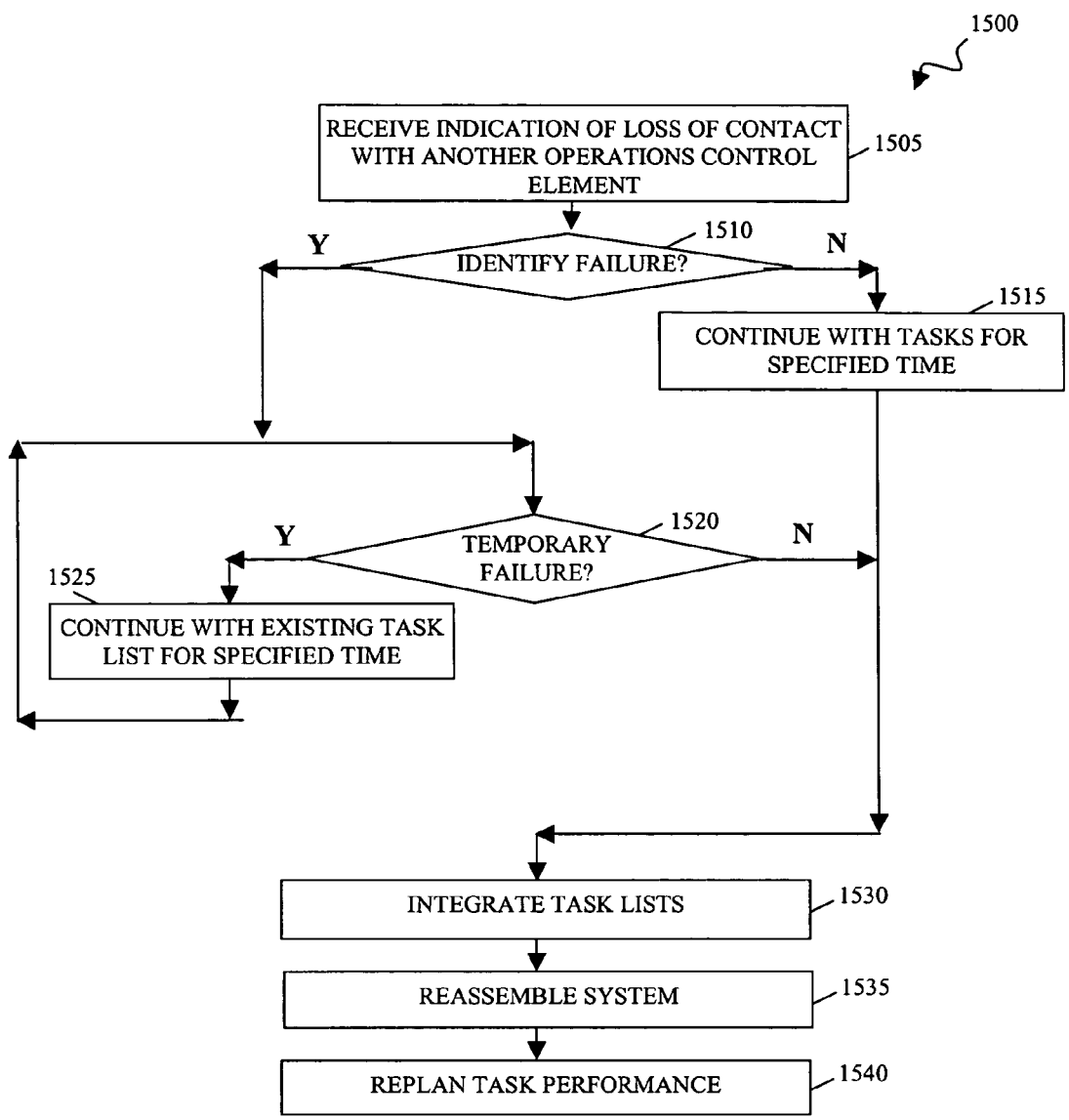
FIGS. 15-18 show processes that can be performed by an operations control element when contact with another operations control element is lost.

FIG. 15 shows a process 1500 that can be performed by an operations control element in a system using the independent approach when contact with another operations control element is lost.

The element performing process 1500 can receive an indication that the other operations control element is lost at 1505. The indication can be a failure of the other element to respond to a polling query or to confirm performance of an activity in a task. The indication can also be received from a third operations control element or from a user who removes a device having the lost operations control element from the system.

The element performing process 1500 can determine if it can identify if the lost operations control element has failed at decision 1510. For example, if the performing element can identify that other technical components of the device having the lost operations control element are still available, then the performing element can conclude that the operations control element has failed. As another example, if the element performing process 1500 receives a power down message from the lost operations control element immediately prior to the operations control element becoming lost, then the performing element can conclude that the lost operations control element has not failed. User input can also be used by the performing element to determine if the lost operations control element has failed.

If the performing element determines that the lost element has not failed or if the performing element determines that it is unable to identify if the lost element has failed, then the performing element continues performing tasks in the manner scheduled before contact was lost for a specified period of time at 1515. Alternatively, if the performing element determines that the lost element has failed, then the performing element determines if the failure is temporary at 1520. For example, the performing element can determine whether or not the failure is temporary by querying a user and receiving user input indicating that the failure is temporary. If it is determined that the failure is temporary, the performing element can continue with the existing task list for a specified time at 1525. When the specified time is reached, the performing element can again attempt to determine if the failure is temporary at 1520.

When the performing element determines that the failure is not temporary or, when the performing element determines that the lost element has not failed or if the performing element is unable to determine if the lost element has failed and the specified time for continuing with tasks has been reached (i.e., at 1515), then the performing element integrates the task lists of the lost element and the other element(s) in the system at 1530. The performing element can reassemble the system at 1535 to accommodate the loss of any capabilities made inaccessible by the loss of the lost element. The performing element can replan the performance of tasks on the task list using the reassembled system at 1540.

In the master approach for unifying devices, loss of contact by one or more subordinate operations control elements with the master operations control element can be addressed by the selection of a new master, reassembly of the system, and replanning of the task list with the available capabilities and continued operation. Alternatively, instead of reassembling and replanning, the new master can run the planned tasks with the available capabilities with the assumption that interconnection was lost, rather than a failure of the old master operations control element. In one implementation, the new master can attempt to obtain user input to identify (or repair) the type of failure so that the proper alternative can be chosen. In the absence of such input, the new master can run planned tasks for a specified period (e.g., seven days) and then replan the task list. Alternatively, the new master can use an alternative method of selecting the alternative. For example, if communication is lost with the master operations control element, but all other operations control elements are functional, as are all devices, then a failure of the master operations control element is assumed, the system is reassembled, and the task list is replanned. As another example, if communication is lost simultaneously with all other devices, then the master operations control element can be assumed functional and the lone operations control element runs currently planned tasks.

Figure 16:
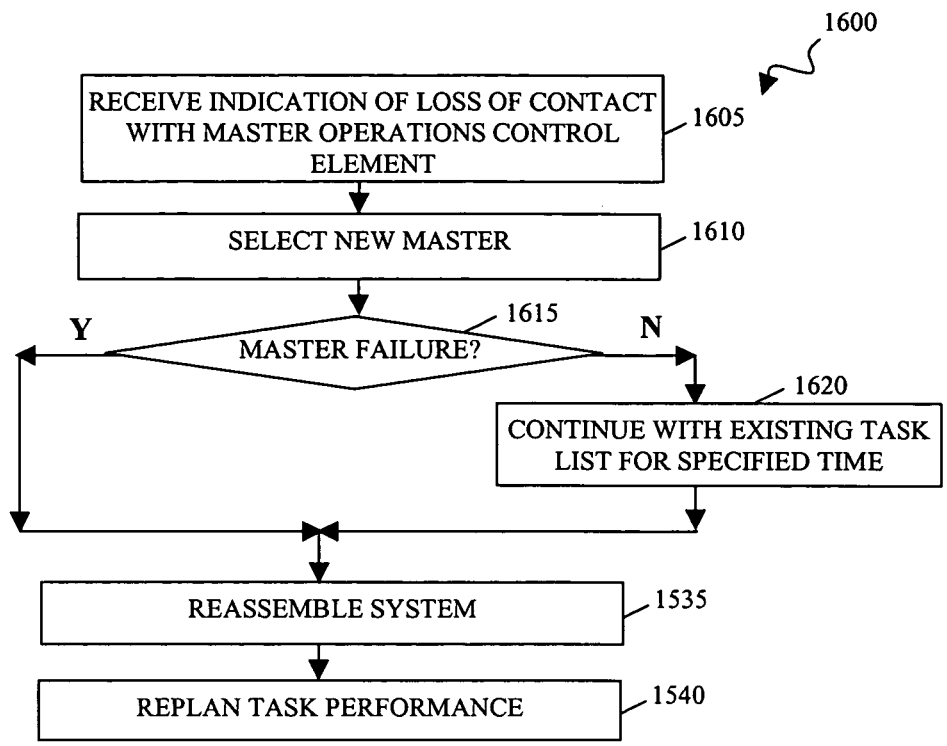

FIG. 16 shows a process 1600 that can be performed by an operations control element in a system using the master approach when contact with the previous master operations control element is lost.

The element performing process 1600 can receive an indication that the previous master operations control element is lost at 1605. The indication can be a failure of the previous master to respond to a polling query or to command performance of a scheduled task. The indication can also be received from a third operations control element or from a user who removes a device having the previous master operations control element from the system.

The performing element can participate in the selection of a new master operations control element at 1610. The new master operations control element can determine if it can identify if loss of the previous master is a result of failure of the previous master at decision 1615.

If the new master determines that the previous master element has not failed or if the new master is unable to determine if the previous master has failed, then the new master continues performing tasks in the manner scheduled before contact was lost for a specified period of time at 1620. Alternatively, if the new master determines that the lost element has failed, or when the specified time has been reached, then the new master element can reassemble the system at 1535 and replan the performance of tasks on the task list using the reassembled system at 1540.

In the synchronized approach for unifying devices, loss of contact between one operations control element and another can cause an operations control element to continue with the tasks that were assigned to available capabilities or to reassemble the system and replan the unified task list with the presumption that the currently available capabilities are the only capabilities. In one implementation, an operations control element can attempt to obtain user input to identify (or repair) the type of failure so that the proper alternative can be chosen. In the absence of such input, an operations control element can continue with the tasks that were assigned to available capabilities for a specified period (e.g., seven days) and then reassemble the system and re-optimize the task list with the presumption of reduced capabilities. Alternatively, an operations control element can use an alternative method of selecting an alternative. For example, if communication is lost with only one operations control element, but all other an operations control elements are functional, as are all devices, then a failure of the lost operations control element can be assumed, the system reassembled, and the task list re-optimized. As another example, if communication is lost simultaneously with all other devices, then the lost operations control element(s) can be assumed to be functional and the operations control element can run tasks that were to be performed with the available capabilities.

Figure 17:
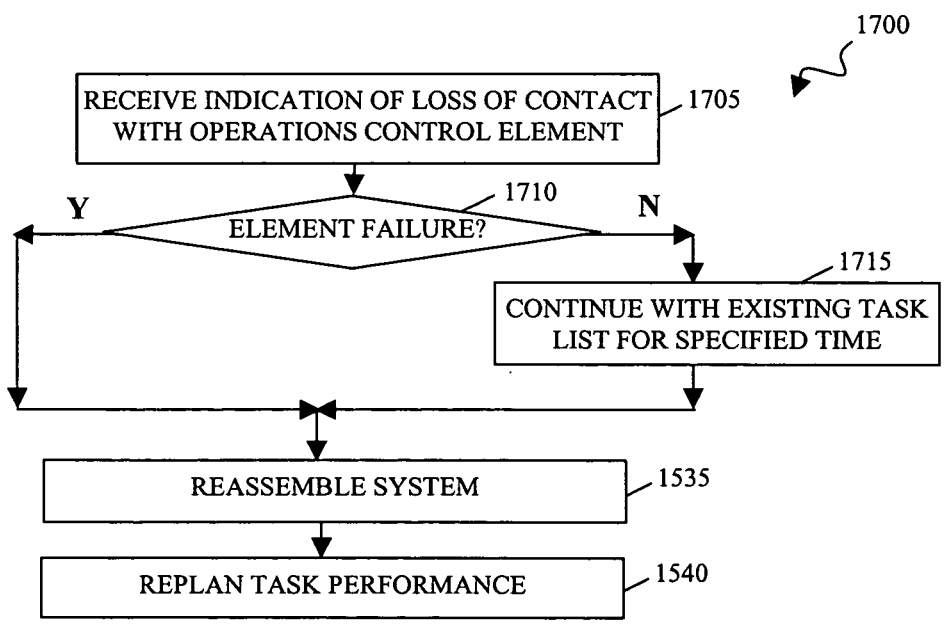

FIG. 17 shows a process 1700 that can be performed by an operations control element in a system using the synchronized approach when contact with another operations control element is lost.

The element performing process 1700 can receive an indication that contact with another operations control element is lost at 1705. The performing element can determine if it can identify if loss of the other element is a result of failure of the other element at decision 1710.

If the performing element determines that the other element has not failed or if the performing element is unable to determine if the other element failed, then the performing element continues performing tasks in the manner scheduled before contact was lost for a specified period of time at 1715. Alternatively, if the performing element determines that the lost element has failed, or when the specified time has been reached, then the performing element can reassemble the system at 1535 and replan the performance of tasks on the task list using the reassembled system at 1540. With the synchronized approach, an integrated task list can be maintained and hence no reintegration need be performed upon the loss of an operations control element.

Figure 18:
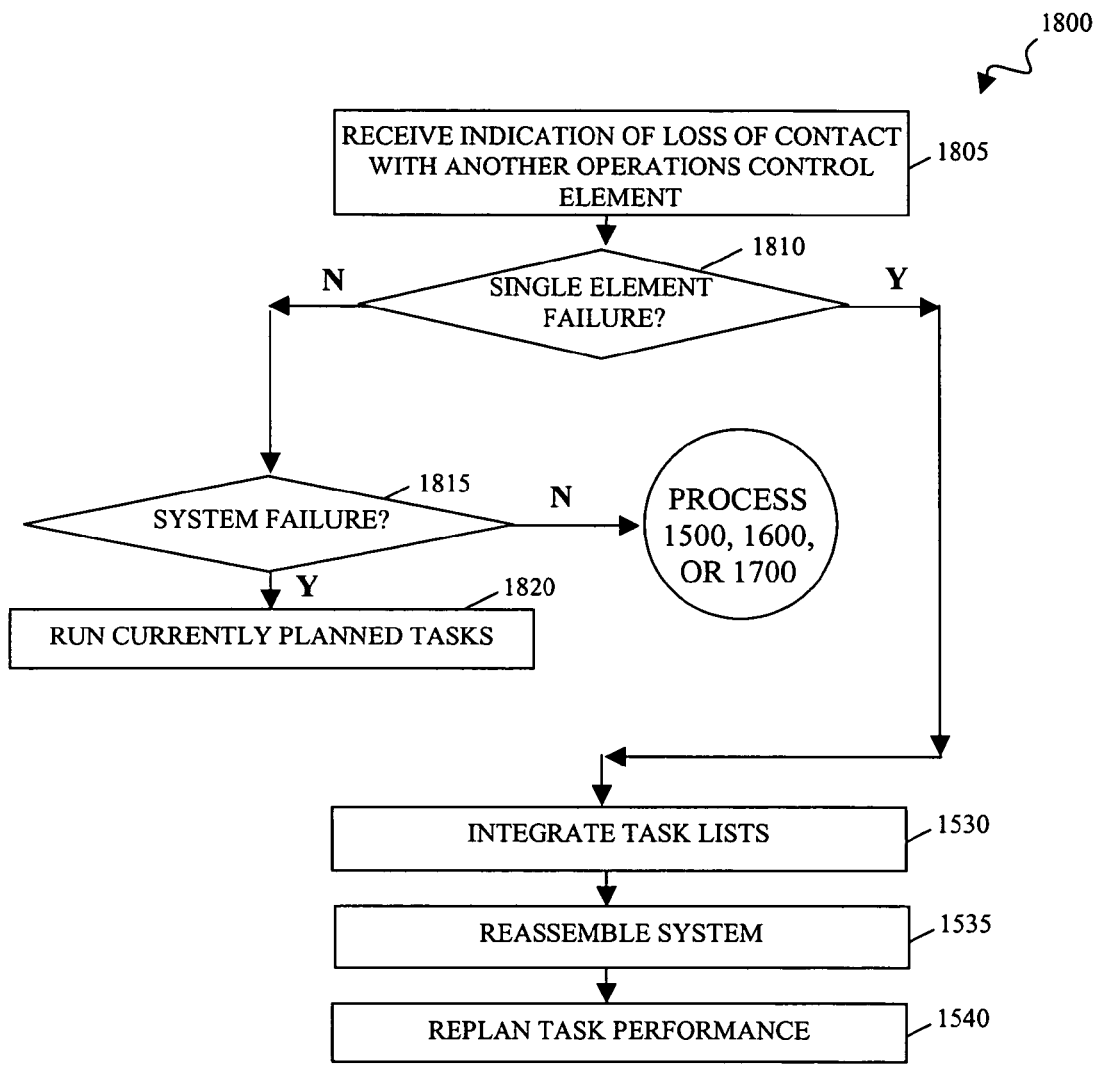

FIG. 18 shows a process 1800 that can be performed by an operations control element in any of a number of different systems when contact with another operations control element is lost.

After the element performing process 1800 receives an indication that contact with another operations control element is lost at 1805, the performing element can determine if the loss of contact limited to the failure of a single operations control element at decision 1810. To determine this, for example, the performing element can poll the other operations control elements in the system to determine to scope of the loss of contact. If the performing element determines if the loss of contact is limited to a single operations control element, then if needed (such as when the system uses the independent approach), the performing element can integrate the task list for the missing element at 1530. The performing element can reassemble the system at 1535 and replan the performance of tasks on the task list using the reassembled system at 1540.

Alternatively, if the performing element determines that the loss of contact is not limited to a single operations control element, then the performing element can determine if the loss of contact is a system failure at decision 1815. From the performing element's perspective, a system failure is a failure where contact with every other operations control element in the system is lost. If the performing element determines that contact with every other operations control element in the system has been lost, then the performing element proceeds to run its currently planned tasks using capabilities available to it at 1820 under the assumption that the performing element has simply been disconnected from the remainder of a fully-operational interconnected system.

Alternatively, if the performing element determines that contact with some of the other operations control elements is maintained, then the performing element can proceed to handle the loss in accordance with one or more of processes 1500, 1600, 1700 (FIGS. 15-17).

A number of implementations have been described. Nevertheless, it will be understood that various modifications may be made. For example, referring the FIG. 7, when a operations control element receives an external prompt directing the immediate performance of a task, the operations control element can first transition to the planning state to confirm that there is no conflict with a scheduled task and then directly transition into the running state after the confirmation. Accordingly, other implementations are within the scope of the following claims.

The invention claimed is:

1. A machine-implemented method for sharing capabilities of an interconnected system of discrete consumer electronic devices, comprising:
   the interconnected system organized into two or more zones, each of the zones including a respective control element and one or more of the consumer electronic devices, wherein the control element can lock or unlock all capabilities of the consumer electronic devices in the interconnected system, wherein locked capabilities prevent assignment of capabilities to other tasks during the lock;
   receiving, in a first zone in the interconnected system, a machine-readable description of a task reserving audio/video content;
   planning how to perform the task using the interconnected system by a first control element associated with the first zone, the first control element assigning responsibility for initiating the performance of the task to one of the consumer electronic devices in accordance with the machine-readable description, wherein the assigning comprises the first control element determining whether the task can be performed within the first zone, in response to the first zone being unable to perform the task, borrowing a unlocked capability from a second zone to perform the task;
   upon assignment of the task, reserving by the first control element a capability for performance of the task and publishing a reservation related to the task and the capability that is to perform the task to other control elements in the interconnected system in response to the reserving; and
   in response to contact with the selected control element being lost:
   i) integrating all the tasks assigned to the lost contact control element into a task list of another control element and
   polling the control element in each zone to determine which control element of which zone has lost the connection with the lost contact control element.

2. The method of claim 1, further comprises selecting a master operations control element in the interconnected system.

3. The method of claim 1, wherein:
   selecting the capability that is to perform the task comprises identifying capabilities of the consumer electronic devices in the interconnected system; and
   assigning responsibility for initiating the performance of the task comprises assigning responsibility based on the identified capabilities.

4. The method of claim 1, wherein performing the task comprises storing data in the consumer electronic devices of the interconnected system using a per-file block-based RAID scheme.

5. The machine-implemented method of claim 1 further comprising:
   receiving the task;
   identifying a first data link used by the first control element;
   identifying a second data link used by a second control element;
   determining which of said first and second data links has more available allocated bandwidth; and
   assigning the task to the control element whose data link has more available allocated bandwidth.

* * * * *